United States Patent
Tomikawa (10) Patent No.: US 6,617,704 B2
(45) Date of Patent: Sep. 9, 2003

(54) HYBRID VEHICLE CONTROL APPARATUS

(75) Inventor: Saburo Tomikawa, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/050,136

(22) Filed: Jan. 18, 2002

(65) Prior Publication Data

US 2002/0105188 A1 Aug. 8, 2002

(30) Foreign Application Priority Data

Feb. 2, 2001 (JP) ...................................... 2001-027391

(51) Int. Cl.⁷ ................................................ H02P 9/04
(52) U.S. Cl. ........................ 290/40 C; 701/22; 180/65.2
(58) Field of Search ............................. 290/40 C, 38 R; 701/22; 180/65.2

(56) References Cited

U.S. PATENT DOCUMENTS

| | | | | |
|---|---|---|---|---|
| 5,343,970 A | * | 9/1994 | Severinsky ................ | 180/65.2 |
| 5,788,005 A | | 8/1998 | Arai | |
| 6,119,799 A | * | 9/2000 | Morisawa et al. ......... | 180/65.2 |
| 6,209,672 B1 | * | 4/2001 | Severinsky ................ | 180/65.2 |
| 6,380,640 B1 | * | 4/2002 | Kanamori et al. ........ | 290/40 C |
| 6,473,683 B1 | * | 10/2002 | Nada ........................... | 701/82 |
| 6,549,832 B2 | * | 4/2003 | Nakasako et al. ............ | 701/22 |
| 6,551,208 B1 | * | 4/2003 | Holmes et al. ................ | 475/5 |
| 2001/0039230 A1 | * | 11/2001 | Severinsky et al. ............ | 477/3 |
| 2001/0044683 A1 | * | 11/2001 | Takaoka et al. ............... | 701/22 |
| 2003/0037977 A1 | * | 2/2003 | Takaoka et al. ............... | 701/22 |

FOREIGN PATENT DOCUMENTS

JP          8300965 A          11/1996

* cited by examiner

Primary Examiner—Nicholas Ponomarenko
(74) Attorney, Agent, or Firm—Shinjyu Global IP Counselors, LLP (57) ABSTRACT

A hybrid vehicle control apparatus controls an engine that rotates at least one first wheel and a mechanically independent electric motor that rotates at least one second wheel. The hybrid vehicle control apparatus stabilizes the vehicle driving performance when drive forces are obtained from both the engine and the electric motor. Thus, the hybrid vehicle control apparatus stabilizes 4WD travel over a wide range using an engine and a comparatively small electric motor. The target front (motor-driven) wheel drive torque is calculated by subtracting the target rear (engine-driven) wheel drive torque from the total target drive torque. Meanwhile, the motor torque upper limit value is estimated from the motor rotational speed. If the front wheel target drive torque exceeds the motor torque upper limit value, the drive torque ΔT, which corresponds to the amount by which the motor torque is insufficient, is added to the rear wheel target drive torque.

19 Claims, 7 Drawing Sheets

HYBRID VEHICLE CONTROL APPARATUS

BACKGROUND OF THE INVENTION

1. Field of the Invention

The present invention relates to a hybrid vehicle control apparatus that controls an engine that rotates at least one first wheel and an electric motor that rotates at least one second wheel that is mechanically independent from the engine. More particularly, the present invention relates to stabilizing the vehicle driving performance when drive forces are obtained from both the engine and the electric motor.

2. Background Information

A four-wheel drive type vehicle control apparatus is well known that drives both the first wheels (e.g., rear wheels) and the second wheels (e.g., front wheels) with an engine. This kind of traditional 4WD system uses a transfer mechanism that includes a multiple disk clutch mechanism to distribute the engine drive torque between the front and rear wheels. Consequently, the total drive torque is held constant even if the distribution ratio of the drive torque changes.

In recent years a hybrid 4WD system has been proposed (see Japanese Laid-Open Patent Publication No. 8-300965) which rotates one set of wheels with an engine and rotates the other set of wheels with an electric motor. In this system, there is no mechanical connection between the front and rear wheels. Rather, the drive torque that is transmitted to each set of drive wheels must be adjusted relative to each other in order to keep the total drive torque constant. This presents new problems in terms of driveability.

In view of the above, there exists a need for an improved hybrid vehicle control apparatus that overcomes the problems of the prior art. This invention addresses this need in the art as well as other needs, which will become apparent to those skilled in the art from this disclosure.

SUMMARY OF THE INVENTION

Generally, the electric motor is advantageous over the engine in terms of response but disadvantageous in terms of output. As a result, several problems arise. For example, as previously mentioned, it is preferable from the standpoint of vehicle driving performance to adjust each drive torque such that the total drive torque of the front and rear wheels is constant. However, if this is done, there is the potential problem that a feeling of speed loss and/or degraded maneuverability will occur when the output requested of the electric motor for rotating the non-engine driven wheels exceeds the output limit of the electric motor. Furthermore, an extremely large output is required of the electric motor if this hybrid 4WD system is to achieve the same degree of 4WD traveling region as a traditional engine-only 4WD system.

In view of these circumstances, the object of the present invention is to provide a hybrid vehicle control apparatus that enables stable 4WD travel over a wide range even with an electric motor that is small in comparison to the engine.

Therefore, in accordance with one aspect of the present invention, a hybrid vehicle control apparatus is provided for a vehicle having front and rear wheels with at least one of the front and rear wheels being an engine driven wheel driven by an internal combustion engine and at least one of the front and rear wheels being a non-engine driven wheel driven by an electric motor that is mechanically independent from the engine. The hybrid vehicle control apparatus basically comprises a target motor torque setting section, a motor output limit determining section, and a torque increasing section. The target motor torque setting section is configured to set a target drive torque of the electric motor. The motor output limit determining section is configured to determine if the target drive torque of the electric motor reaches an output limit of the electric motor under current operating conditions. The torque increasing section is configured to increase drive torque to the engine driven wheels when it is determined that the target drive torque of the electric motor reaches the output limit of the electric motor.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
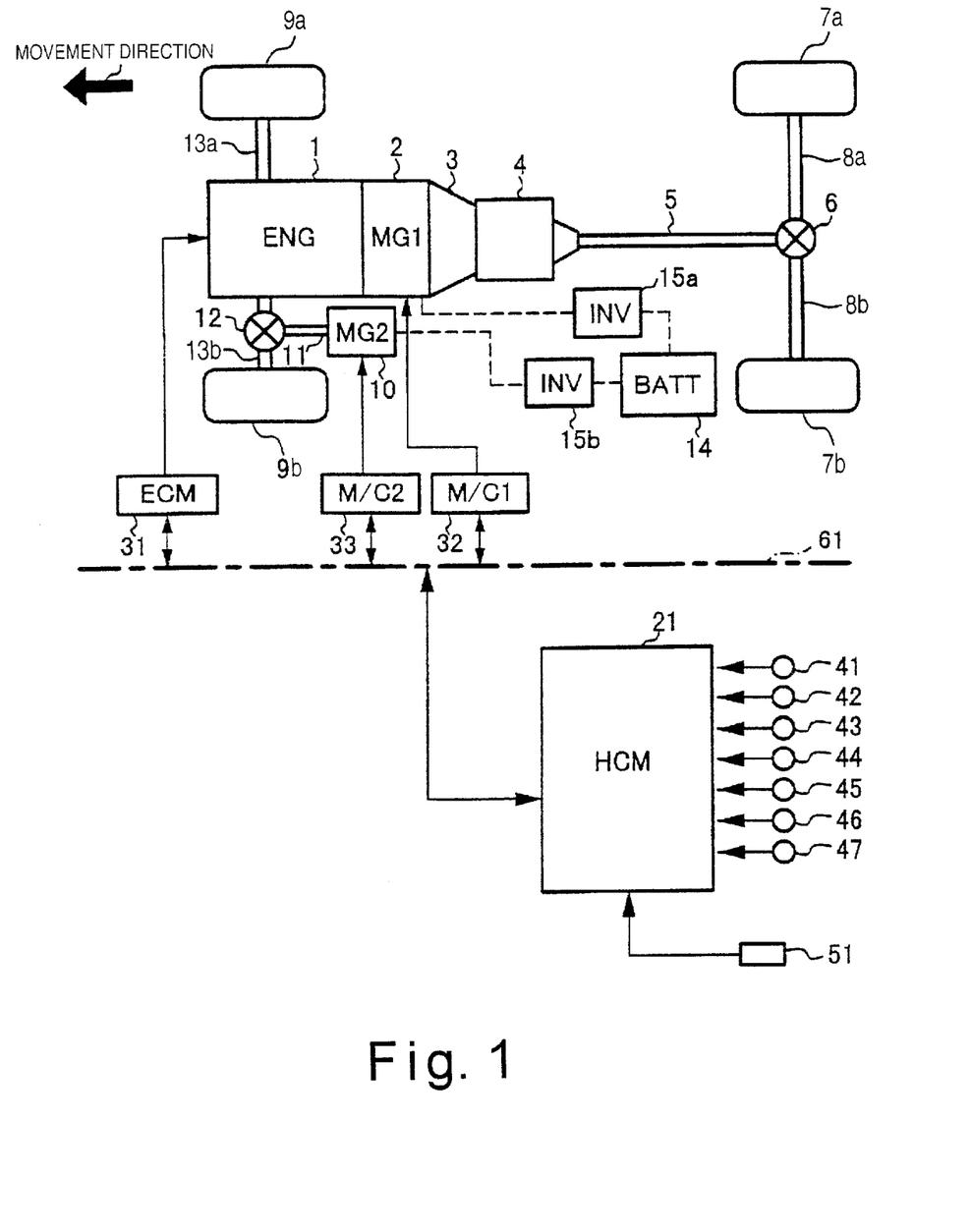
FIG. 1 is a schematic view of a drive transmission system of a vehicle equipped with a hybrid vehicle control apparatus in accordance with one embodiment of the present invention.

Referring initially to FIG. 1, a drive transmission system of a vehicle equipped with a hybrid vehicle control apparatus is schematically illustrated to explain a first embodiment of the present invention. The vehicle's drive transmission system basically includes a combustion engine 1, a motor-generator (MG1) 2, a torque converter 3, a transmission 4, a power transmission shaft 5, a rear wheel differential gear 6. The rear wheel differential gear 6 is operatively coupled to a pair of rear wheels 7a and 7b by a pair of wheel drive shafts 8a and 8b, respectively. Thus, the rear wheels 7a and 7b are engine driven wheels. The front wheels 9a and 9b are operatively coupled to a second motor-generator (MG2) 10 by a front power transmission shaft 11 that is coupled to a front wheel differential gear 12 of the front drive shafts 13a and 13b. Thus, the front wheels 9a and 9b are non-engine drive wheels. The direction of vehicle movement is toward the left in FIG. 1. In other words, the front wheels 9a and 9b are positioned on the left side of FIG. 1, while the rear wheels 7a and 7b are positioned on the right side of FIG. 1.

In this vehicle, the motor-generator 2 is an electric motor providing a generating function. The motor generator 2 is connected directly to the output side of the engine 1 in a conventional manner. The torque converter 3 and the transmission 4 are further connected to the engine 1 and the motor-generator 2 in a conventional manner. The power transmission shaft or propeller shaft 5 is connected to the output side of the transmission 4 in a conventional manner. The propeller shaft 5 serves to drive the wheel drive shafts 8a and 8b of the engine driven wheels 7a and 7b through the rear wheel differential gear 6.

The motor-generator 2 functions as an assisting device for the engine 1: when the engine 1 is started or when the vehicle is starting to move. Thus, the motor generator 2 is used as a starting device that cranks the engine 1. Additionally, when the vehicle is decelerated, the motor-generator 2 can be operated as a generator such that braking energy is regenerated into electric power that is used to charge a battery 14.

The motor-generator 2 is electrically connected to the battery 14 through an inverter 15a. When the drive torque is being obtained from the motor-generator 2, the electric power discharged from the battery 14 is converted to three-phase AC power by the inverter 15a and supplied to the motor-generator 2.

Meanwhile, the motor-generator 10 is provided for the non-engine driven wheels, i.e., the front wheels 9a and 9b. The drive torque produced by the motor-generator 10 is transmitted to the front drive shafts 13a and 13b of the front motor driven wheels 9a and 9b via the relatively small propeller shaft 11 and the front wheel differential gear 12, which are connected to the output side of the motor-generator 10. Thus, the drive force of the vehicle can be obtained from the front wheels 9a and 9b as well as from the rear wheels 7a and 7b.

The motor-generator 10 is electrically connected to its power source, i.e., the battery 14 through an inverter 15b. When drive torque is being obtained from the motor-generator 10, electric power discharged from the battery 14 is converted to three-phase AC power by the inverter 15b and supplied to the motor-generator 10.

Since there is no mechanical connection between the rear wheel drive shafts 8a and 8b and the front drive shafts 13a and 13b, it is possible to transmit the drive torques to the front and rear drive shafts in an unrelated manner. In other words, a first drive torque is transmitted to rear wheel drive shafts 8a and 8b from the engine 1 and the motor-generator 2, while a second drive torque is transmitted to the front drive shafts 13a and 13b from the motor-generator 10.

When in the normal traveling mode, the drive force of the vehicle is produced in an FR format, i.e., only the rear wheels 7a and 7b are driven. When the vehicle is to be put into the four-wheel drive mode based on the driver's selection or the like, a 4WD format is achieved by transmitting the second drive torque from the motor-generator 10 to the front wheels 9a and 9b so that both the front wheels 9a and 9b and the rear wheels 7a and 7b are driven.

Next the control system will be explained in a general manner. A hybrid control module (HCM) 21 serves as an integrated controller for the engine 1 and the motor-generators 2 and 10. The hybrid control module 21 receives the following inputs: an accelerator position APO from an accelerator position sensor 41; a vehicle speed V from a vehicle speed sensor 42; a front right wheel rotational speed Nfr, a front left wheel rotational speed Nfl, a rear right wheel rotational speed Nrr, and a rear left wheel rotational speed Nrl from wheel speed sensors 43 to 46 mounted respectively to the front and rear wheels 9a and 9b, 7a and 7b; and a motor rotational speed NM from a rotational speed sensor 47 of the motor-generator 10. Also inputted is the travel mode shifting signal from the 4WD shift switch 51 provided inside the vehicle cabin.

Based on various operating conditions including these above-mentioned data, the hybrid control module 21 issues control commands to the engine control module (ECM) 31 and the respective control devices, i.e., the motor controllers (M/C) 32 and 33 of the motor-generators 2 and 10 via a communication line 61.

The hybrid control module 21 is provided with a target motor torque setting section, a motor output limit determining section, a torque increasing section, a slippage degree detecting section, a torque increase suppressing section, and a total drive torque reducing section. Each of these sections will be described in detail later.

The control module 21 preferably includes a microcomputer with a drive torque control program that controls the torque to the front wheels 9a and 9b, as discussed below. The control module 21 can also include other conventional components such as an input interface circuit, an output interface circuit, and storage devices such as a ROM (Read Only Memory) device and a RAM (Random Access Memory) device. The memory circuit stores processing results and control programs that are run by the processor circuit. The control module 21 is operatively coupled to the engine control module 31 and the motor controllers 32 and 33 in a conventional manner. The internal RAM of the control module 21 stores statuses of operational flags and various control data. The internal ROM of the control module 21 stores the predetermined data for various operations. The control module 21 is capable of selectively controlling any of the components of the control system in accordance with the control program. It will be apparent to those skilled in the art from this disclosure that the precise structure and algorithms for control module 21 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 2:
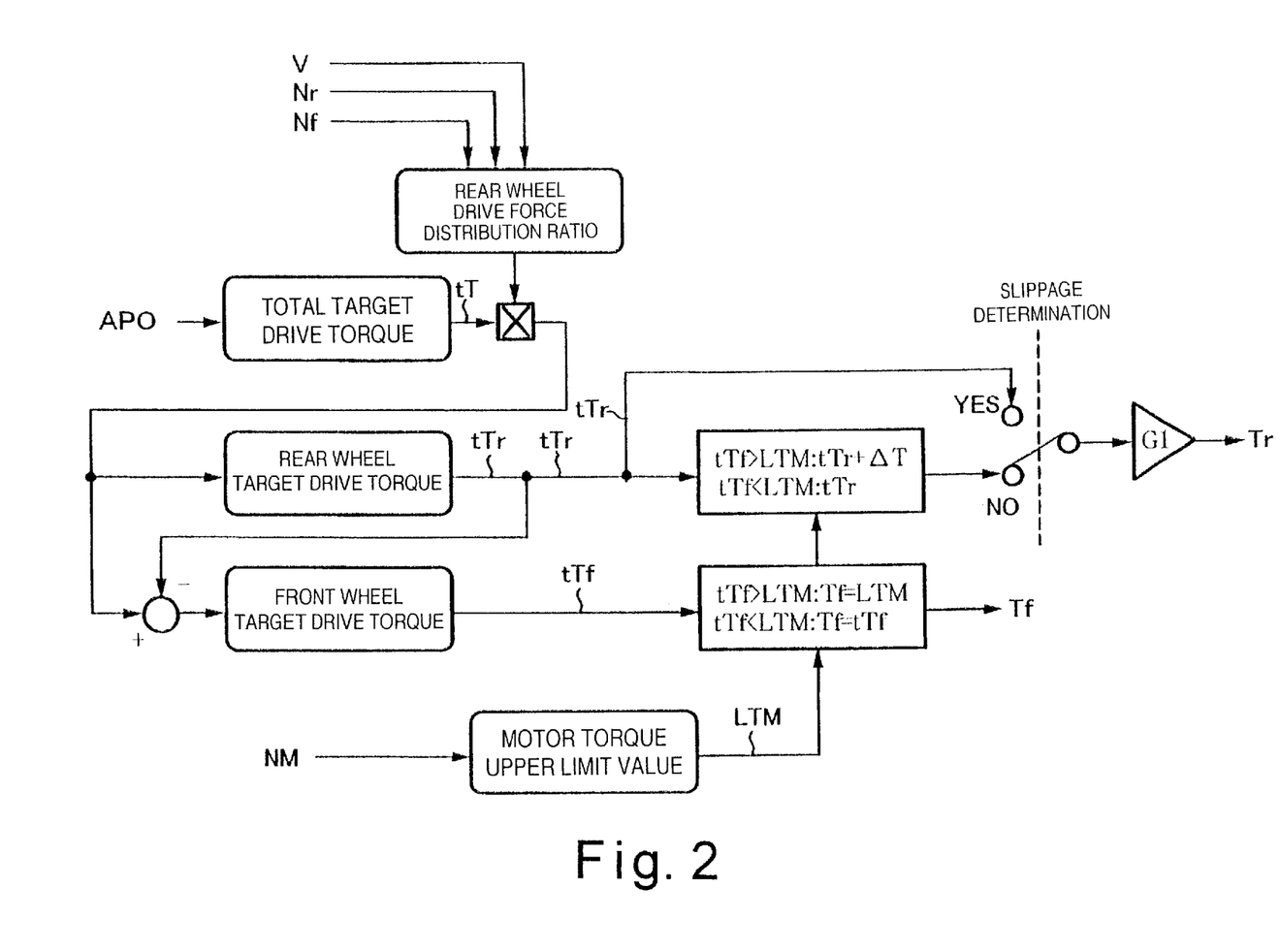
FIG. 2 is a functional block diagram of the hybrid vehicle control apparatus in accordance with one embodiment of the present invention.

Next, the control that the hybrid control module 21 executes when the vehicle is traveling in the four-wheel drive mode will be explained with reference to the block diagram shown in FIG. 2.

The hybrid control module 21 first calculates the total target drive torque tT required to produce the vehicle drive force desired by the driver based on the accelerator position APO. The total drive torque corresponds to the sum of the drive torques obtained from all of the power sources, i.e., the engine 1 and the motor-generators 2 and 10.

Then, based on the average rear wheel rotational speed Nr and the average front wheel rotational speed Nf, the hybrid control module 21 sets a rear wheel drive force distribution ratio, which is the ratio of the vehicle drive force intended by the driver that should be carried by the rear wheels 7a and 7b, i.e., the engine driven wheels. It then calculates the rear wheel target drive torque tTr which is equivalent to the "target engine torque" of the present invention, by multiplying the calculated total target drive torque tT by the rear wheel drive force distribution ratio.

It also calculates the front wheel target drive torque tTf by subtracting the rear wheel target drive torque tTr from the total target drive torque tT. This front wheel target drive torque tTf corresponds to the target drive torque of the motor—motor 10.

The hybrid control module 21 estimates a motor torque upper limit value LTM, which is the output limit of the motor-generator 10 under the current operating conditions, based on the motor rotational speed NM. If the front wheel target drive torque tTf exceeds the motor torque upper limit value LTM, then the hybrid control module 21 sets the output front wheel drive torque Tf to the motor torque upper limit value LTM. Otherwise, the difference between the total target drive torque tT and the rear wheel target drive torque tTr is used without correction as the output front wheel drive torque Tf. In this embodiment, the motor torque upper limit value LTM is the maximum value of torque that can be produced as determined by the characteristics of the motor-generator 10.

The hybrid control module 21 then sends the set value for the output front wheel drive torque Tf to the motor controller 33 as a command signal for the motor-generator 10. Furthermore, the hybrid control module 21 executes control so as to increase the drive torque of the engine driven wheels 7a and 7b when the front wheel target drive torque tTf exceeds the motor torque upper limit value LTM.

For example, this control is accomplished by conducting supplementation wherein the drive torque $\Delta T$ corresponding to the amount by which the front wheel target drive torque tTf exceeds the motor torque upper limit value LTM is added to the target drive torque tTr of the rear wheels 7a and 7b so as to achieve the total target drive torque tT. Naturally, an equivalent effect could also be obtained by increasing the drive torque that is smaller than the excess amount.

During the slippage determination, the hybrid control module 21 detects the degree of slippage between the rear wheels 7a and 7b and the road surface. If it is determined that the amount of slippage is large and the slippage degree exceeds predetermined allowed range, the aforementioned compensation is prohibited in order to avoid promoting slippage in the rear wheels 7a and 7b.

The hybrid control module 21 takes the value obtained through multiplication of the output rear wheel drive torque Tr (which was set through supplementation of the drive torque and determination of slippage) by a prescribed gain G1 (0<G1<1) and divides it by a gear ratio and the torque ratio of the torque converter 3. Based on the result, the hybrid control module 21 sets command signals for the engine 1 and the motor-generator 2 and sends them to the engine control module 31 and the motor controller 32.

In order to provide a clearer understanding, the control of the hybrid control module 21 just described will be explained based on the flowcharts shown in FIGS. 3 to 5.

In step S1, the accelerator position APO, the vehicle speed V, the front right wheel rotational speed Nfr, the front left wheel rotational speed Nfl, the rear right wheel rotational speed Nrr, the rear left wheel rotational speed Nrl, and the motor rotational speed NM are read in as operation condition detection parameters.

In step S2, the total target drive torque tT is calculated based on the accelerator position APO by referring to a map.

Figure 3:
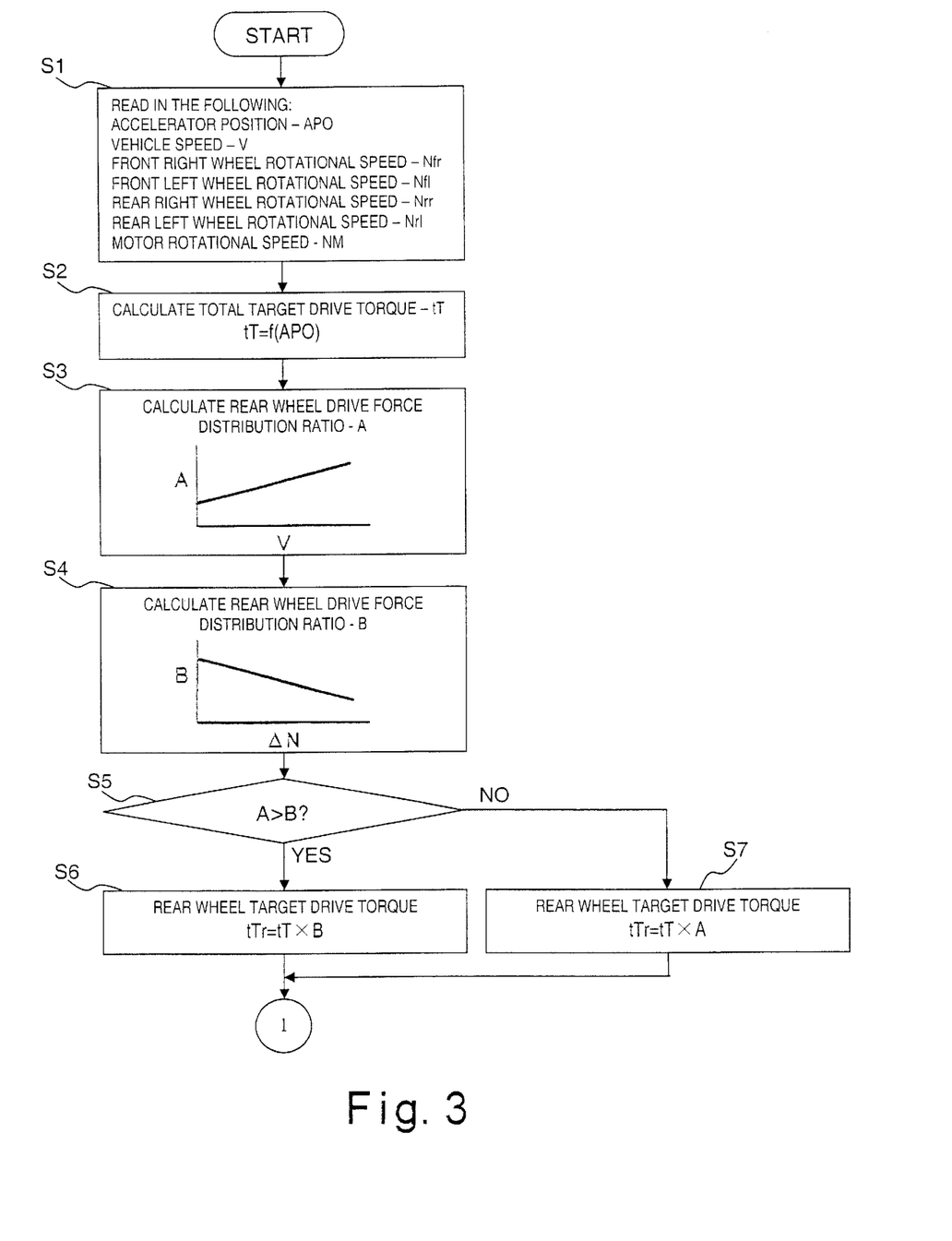
FIG. 3 is a flowchart of the rear wheel target drive torque calculating routine of the hybrid vehicle control apparatus in accordance with one embodiment of the present invention.

In step S3, the rear wheel drive force distribution ratio A as based on the vehicle speed V is calculated by referring to a map that shows a trend that increases as the vehicle speed V increases, as shown in FIG. 3.

Here, the rear wheel drive force distribution ratio A is determined in view of the maximum traction as based on the fuel consumption and the vehicle speed V. For example, it is good to set the rear wheel drive force distribution ratio A to 50% when the vehicle speed V is roughly 0. The rear wheel drive force distribution ratio A is set to values that gradually shift the drive force to the rear wheels 7a and 7b as vehicle speed V increases. Finally, the rear wheel drive force distribution ratio A is set to 100% during high-speed operation.

In step S4, the rear wheel drive force distribution ratio B as based on the rear-front wheel rotational speed difference $\Delta N$ is calculated by referring to a map. Here, the rear-front wheel rotational speed difference $\Delta N$ is found by calculating the difference Nr−Nf, where Nr is the average rotational speed of the rear wheels 7a and 7b (given by (Nrr+Nrl)/2) and Nf is the average rotational speed of the front wheels 9a and 9b (given by (Nfr+Nfl)/2). The map referred to has such a trend that rear wheel drive force distribution ratio B decreases as the difference Nr−Nf increases.

In order to obtain the drive force more evenly from the front and rear wheels as the amount of slippage of the rear wheels 7a and 7b increases, it is good to set the rear wheel drive force distribution ratio B, for example, to 100% when rear-front wheel rotational speed difference $\Delta N$ is roughly 0. The rear-front wheel rotational speed difference $\Delta N$ is set to values that gradually shift the drive force to the front wheels 9a and 9b as rear-front wheel rotational speed difference $\Delta Nr$ increases. Finally, the rear-front wheel rotational speed difference $\Delta N$ is set down to 50%.

In step S5, it is determined whether or not the rear wheel drive force distribution ratio A is larger than rear wheel drive force distribution ratio B. If A is larger than B (A>B), control proceeds to step S6. Otherwise, control proceeds to step S7.

In step S6, the rear wheel target drive torque tTr is calculated by multiplying the total target drive torque tT by the rear wheel drive force distribution ratio B (tTr=tT×B). In other words, if the rear wheel drive force distribution ratio B is less than the rear wheel drive force distribution ratio A, then this indicates that the rear-front wheel rotational speed difference $\Delta N$ has increased and slippage is occurring. Consequently, even when traveling at a high speed, an effort is made to suppress slippage by setting the rear wheel drive force distribution ratio to a low value, thus distributing the drive force between the front wheels 9a and 9b and the rear wheels 7a and 7b.

In step S7, the rear wheel target drive torque tTr is calculated by multiplying the total target drive torque tT by the rear wheel drive force distribution ratio A (tTr=tT×A), thus giving priority to efficient fuel consumption.

Figure 4:
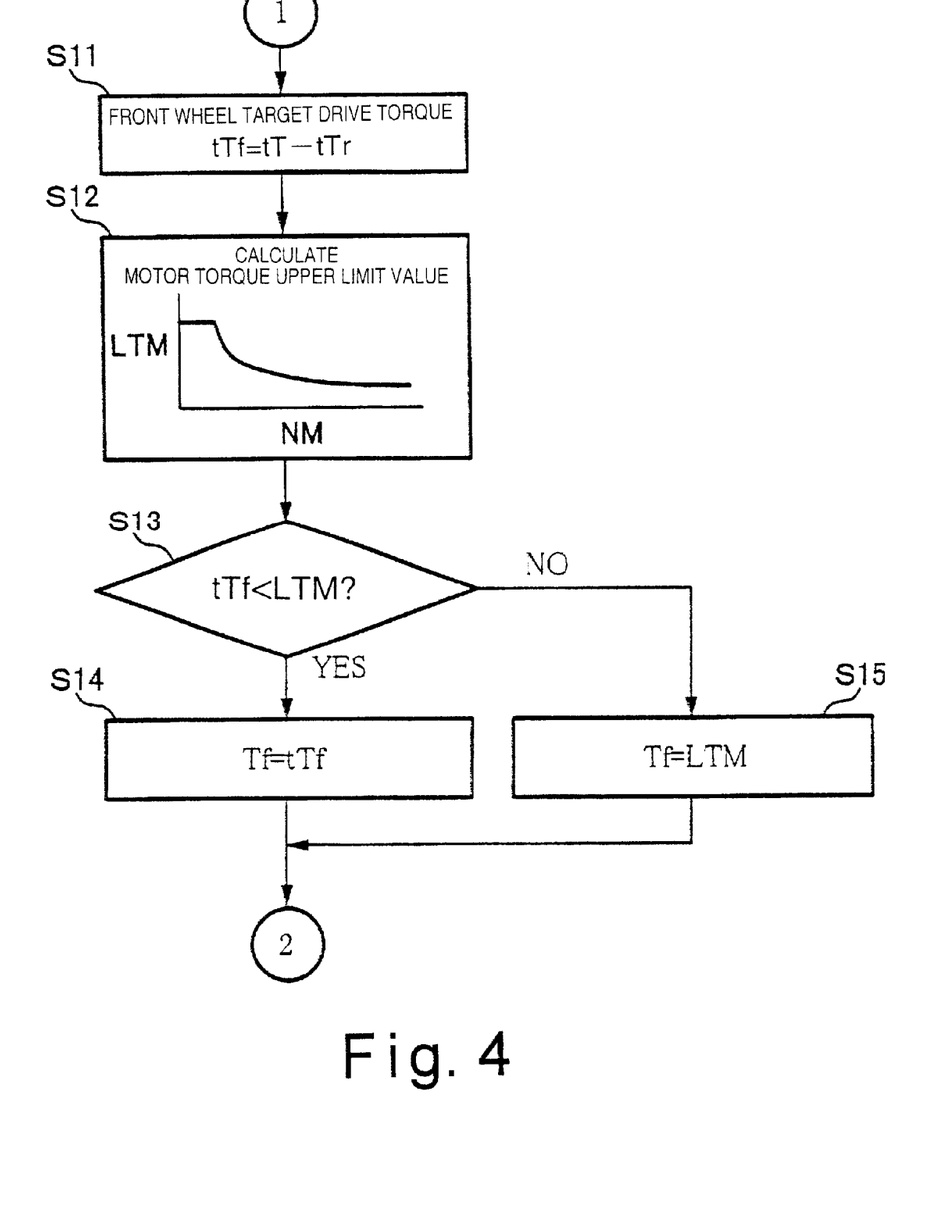
FIG. 4 is a flowchart of the output front wheel drive torque calculating routine of the hybrid vehicle control apparatus in accordance with one embodiment of the present invention.

Moving on to the flowchart shown in FIG. 4, in step S11, the front wheel target drive torque tTf is calculated by subtracting the rear wheel target drive torque tTr from the total target drive torque tT. Step S11 corresponds to a target motor torque setting section of the hybrid control module 21.

In step S12, the motor torque upper limit value LTM, which indicates the current output limit of electric motor 10, is estimated based on the motor rotational speed NM. The motor torque upper limit value LTM follows a trend whereby it decreases in the high-speed rotation region of the electric motor 10. In addition to the motor rotational speed NM, it is also good to consider the capacity of the battery 14 and the temperature of the motor-generator 10 as parameters for estimating the motor torque upper limit value LTM.

In step S13, it is determined whether or not the front wheel target drive torque tTf is smaller than the motor torque upper limit value LTM, i.e., whether or not the target drive torque set for the motor-generator 10 in the current stage reaches the output limit of the motor-generator 10.

As a result, when front wheel target drive torque tTf is determined to be smaller than the motor torque upper limit value LTM, control proceeds to step S14 and, since the motor-generator 10 can produce the front wheel target drive torque tTf, the front wheel target drive torque tTf becomes the output front wheel drive torque Tf. Otherwise, control proceeds to step S15, where the motor torque upper limit value LTM is set as the output front wheel drive torque Tf, and inefficient operation of the motor-generator 10 is avoided.

Steps S12 and S13 correspond to a motor output limit determining section of the hybrid control module 21.

Figure 5:
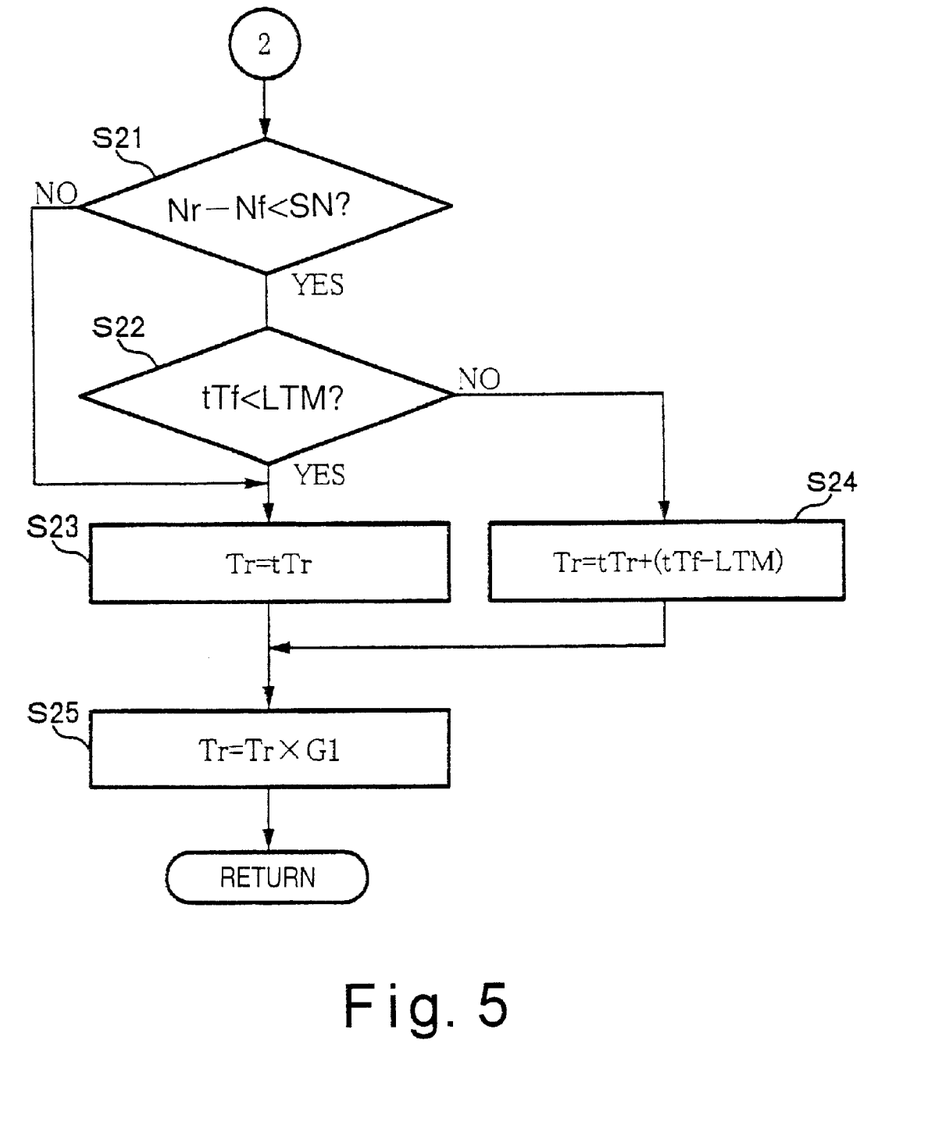
FIG. 5 is a flowchart of the output rear wheel drive torque calculating routine of the hybrid vehicle control apparatus in accordance with one embodiment of the present invention.

Moving on to the flowchart shown in FIG. 5, in step S21, slippage is determined by determining whether or not the front-rear wheel rotational speed difference $\Delta N$ is within an allowable range. In this embodiment, the front-rear wheel rotational speed difference $\Delta N$ (equivalent to the "slippage degree" of the present invention) is the difference between the average rear wheel rotational speed Nr and the average front wheel rotational speed Nf. In this step, it is determined whether or not this difference Nr−Nf is smaller than threshold value SN, which is a prescribed allowable limit. When conducting this determination, it is also acceptable to apply a correction based on vehicle speed V to the difference (Nr−Nf) between the average rear wheel rotational speed Nr and the average front wheel rotational speed Nf. Thus, step S21 constitutes a slippage degree detecting section of the hybrid control module 21.

When it is determined in step S21 that difference Nr−Nf is smaller than the threshold value SN, control proceeds to step S22. Otherwise, i.e., when it is determined that the difference Nr−Nf is greater than or equal to the threshold value SN, control proceeds to step S23 (discussed later). Actually, in order to properly determine if slippage is occurring, it is good to configure the step such that control only proceeds to step S23 when a state in which the difference Nr−Nf is greater than or equal to the threshold value SN continues for a prescribed number of cycles or amount of time. Step S23 corresponds to a torque increase suppressing section of the hybrid control module 21.

In step S22, it is determined whether or not the front wheel target drive torque tTf is smaller than the motor torque upper limit LTM. When it is determined that the front wheel target drive torque tTf is smaller than the motor torque upper limit LTM, control proceeds to step S23. Otherwise, control proceeds to step S24.

In step S23, the rear wheel target drive torque tTr is set as the output rear wheel drive torque Tr.

In step S24, the sum of the rear wheel target drive torque tTr and the amount tTf−LTM, i.e., the amount by which the front wheel target drive torque tTf exceeds the motor torque upper limit value LTM, (=tTr+(tTf−LTM)) is set as output rear wheel drive torque Tr. As a result of this processing, the amount by which the output of the motor-generator 10 is insufficient is supplemented by the drive torque of the engine 1 and/or the motor-generator 2. Thus, step S24 corresponds to a torque increasing section of the hybrid control module 21.

The processing of step S24 is only executed when the occurrence of slippage is not detected in the slippage determination section (step S21) and it is determined that the front wheel target drive torque tTf is larger than the motor torque upper limit LTM. Thus, the rear wheel drive torque is not increased in the aforementioned manner when it is not necessary to supplement the total drive torque nor when slippage occurred. Therefore, there is no promotion of further slippage when slippage is occurring.

In step S25, the rear wheel drive command value is set to a smaller value by multiplying the output rear wheel drive torque Tr by a prescribed gain G1 (0<G1<0) so that a smaller total drive torque is obtained. As a result, the driver is not given an uncomfortable feeling of sudden acceleration when the total drive torque exceeds the command value because of variation in the actual rear wheel drive torque.

Figure 6:
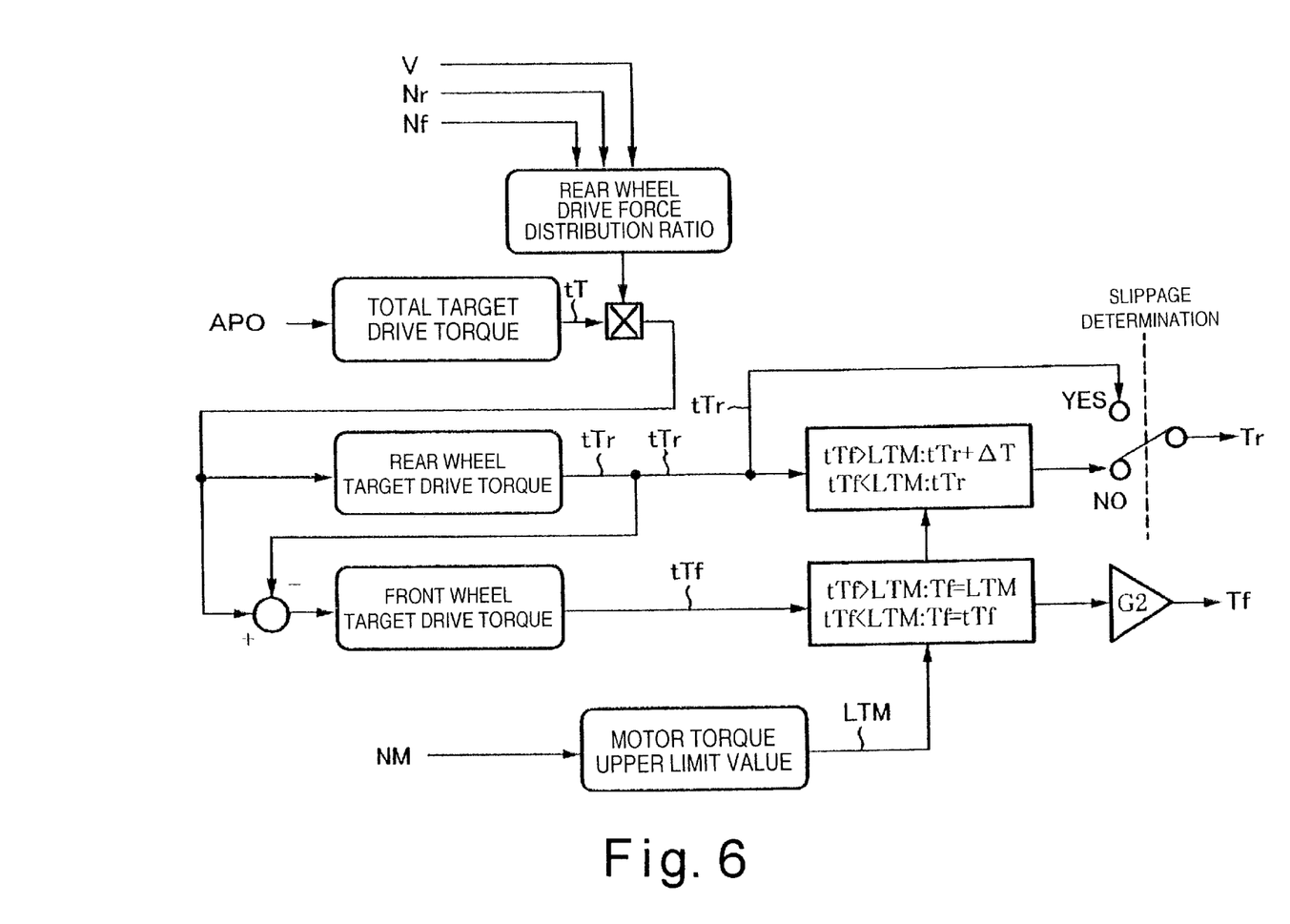
FIG. 6 is a functional block diagram of another hybrid vehicle control apparatus in accordance with another embodiment of the present invention.

In order to obtain a similar effect to that of step S25, it is also acceptable to multiply the output front wheel drive torque Tf by a prescribed gain G2 (0<G2<1), as is done in the flowchart shown in FIG. 6. If this is done, the front wheel drive command value will be set to a smaller value and a smaller total drive torque can be produced.

Step S25 constitutes a total drive torque reducing section of the hybrid control module 21. The total drive torque reducing section of the hybrid control module 21 operates such that the total drive force produced based on the driver's intent is lowered when drive torque is obtained from both the engine driven wheels and the non-engine driven wheels. Therefore, even if the actual drive torque of the engine or electric motor happens to increase, sudden acceleration not intended by the driver can be prevented.

Finally, the effect of the present invention will now be discussed with reference to FIGS. 7 and 8. Basically, FIGS. 7 and 8 illustrate the change in the total drive torque, the rear wheel drive torque, and the front wheel drive torque when the front-rear wheel drive force distribution is changed and when the vehicle is shifted from the two-wheel drive mode (in which the rear wheel drive force distribution ratio is 100%) to the four-wheel drive mode at time t0.

Figure 7:
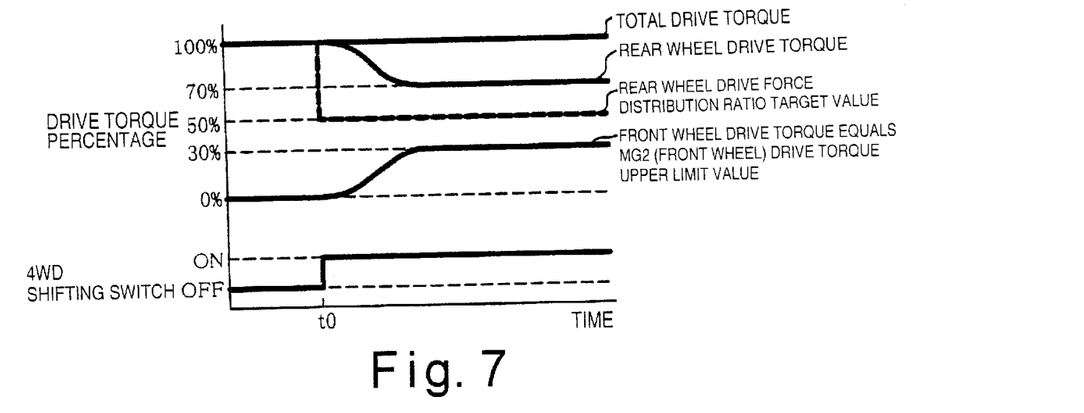
FIG. 7 is a first graph that illustrates the changes that occur in the total drive torque, rear wheel drive torque, and front wheel drive torque when 4WD is shifted.
Figure 8:
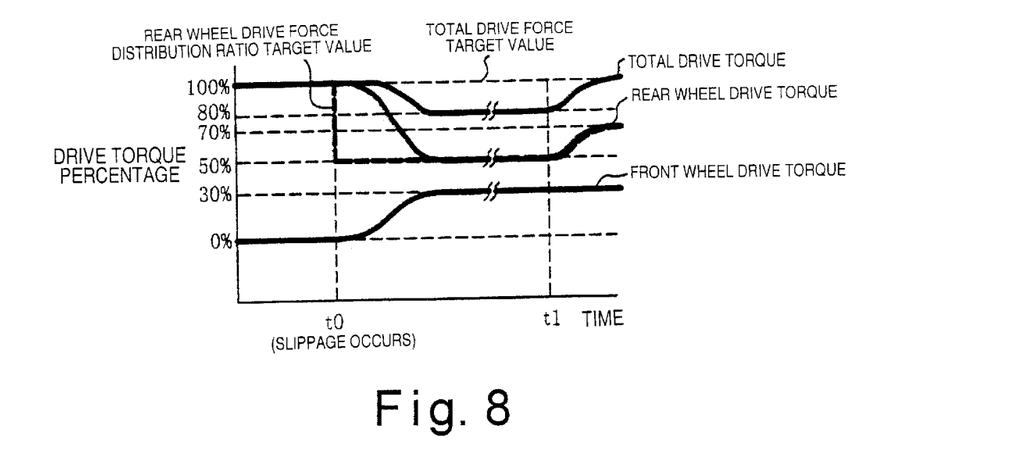
FIG. 8 is a second graph that illustrates the changes that occur in the total drive torque, rear wheel drive torque, and front wheel drive torque when 4WD is shifted.

In FIG. 7, the 4WD shifting switch 51 turns ON and the rear wheel drive force distribution ratio changes from 100% to 50% (the front wheel drive force: the rear wheel drive force=50:50). In this case, slippage does not occur and, if the electric motor 10 can produce enough drive torque to produce 50% of the drive force, the front wheel drive torque will be set equal to the rear wheel drive torque.

However, depending on the operating conditions, there are cases where the electric motor 10 can only produce a portion of the required 50%, e.g., only 30% of the total drive torque (as shown in the figure), due to its output limit.

With the present invention, the remaining 20% of the drive torque corresponding to this insufficiency is produced at the engine driven wheels 7a and 7b (making a total of 70% produced at the wheels 7a and 7b) so that the total drive torque is held constant. Consequently, even if the 4WD travel mode is conducted using a relatively small motor-generator 10 as the drive source for the non-engine driven wheels 9a and 9b, the desired total drive torque can always be obtained (particularly during high-speed travel, during which the motor torque tends to become insufficient) and a feeling of speed loss and/or degraded maneuverability can be prevented.

The output limit of the present invention is not limited to the torque that can be produced as determined by the characteristics of the motor-generator 10, but can be set based on an arbitrary perspective. Therefore, if the output limit is set from the perspective of efficiency, a power source system that takes advantage of the characteristics of engines and motors to the maximum degree can be constructed by reducing the motor torque in operation regions (e.g., during high-speed rotation) where the motor-generator 10 is disadvantageous (thus avoiding excessive operation of the motor-generator) and making up the difference with the engine 1.

In FIG. 8, slippage occurs (during rapid acceleration, for example) while traveling with a rear wheel drive force distribution ratio of 100%. At time t0, a drive force distribution shifting command is issued and the rear wheel drive force distribution ratio changes to 50%. Here, if the motor-generator 10 produces only 30% of the total drive torque due to its output limit, it is necessary to produce the remaining 70% at the engine-driven wheels 7a and 7b in order to hold the total drive torque constant. However, since slippage is occurring in this case, the rear wheel torque is not corrected (increased). Rather, in response to the initial rear wheel drive force distribution ratio, only 50% of the total drive torque is produced at the engine driven wheels 7a and 7b. Thus, although the total drive torque declines temporarily while the slippage is occurring, the slippage is ended early by giving priority to suppression of the slippage and the total drive torque can be returned to its original 100% by supplementing the drive force at the engine driven wheels starting from time t1, at which time the slippage has ended.

The term "configured" as used herein to describe a component, section or part of a device includes hardware and/or software that is constructed and/or programmed to carry out the desired function. As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-027391. The entire disclosure of Japanese Patent Application No. 2001-027391 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A hybrid vehicle control apparatus for a vehicle having front and rear wheels with at least one of the front and rear wheels being an engine driven wheel driven by an internal combustion engine and at least one of the front and rear wheels being a non-engine driven wheel driven by an electric motor that is mechanically independent from the engine, said hybrid vehicle control apparatus comprising:

a target motor torque setting section configured to set a target drive torque of the electric motor;

a motor output limit determining section configured to determine if said target drive torque of the electric motor reaches an output limit of the electric motor under current operating conditions; and a torque increasing section configured to increase drive torque to the engine driven wheel when it is determined that said target drive torque of the electric motor reaches said output limit of the electric motor.

2. The hybrid vehicle control apparatus as recited in claim 1, further comprising a slippage degree detecting section configured to detect a degree of slippage of the engine driven wheel with respect to a road surface; and a torque increase suppressing section configured to suppress increase of drive torque by said torque increasing section when said degree of slippage detected by said slippage degree detecting section exceeds a predetermined allowable limit.

3. The hybrid vehicle control apparatus as recited in claim 2, wherein said slippage degree detecting section is configured to detect said slippage degree based on the rotational speed difference between the engine driven wheel and the non-engine driven wheel.

4. The hybrid vehicle control apparatus as recited in claim 3, wherein said torque increasing section is configured to increase drive torque to the engine driven wheel by an amount equivalent to an amount by which the output limit of the electric motor is insufficient with respect to the target drive torque of the electric motor.

5. The hybrid vehicle control apparatus as recited in claim 4, further comprising a total drive torque reducing section configured to reduce a driver-intent-based total drive torque when total drive torque is being obtained by both the engine driven wheel and the non-engine driven wheel.

6. The hybrid vehicle control apparatus as recited in claim 1, wherein said torque increasing section is configured to increase drive torque to the engine driven wheel by an amount equivalent to an amount by which said output limit of the electric motor is insufficient with respect to said target drive torque of the electric motor.

7. The hybrid vehicle control apparatus as recited in claim 6, further comprising a total drive torque reducing section configured to reduce a driver-intent-based total drive torque when total drive torque is being obtained by both the engine driven wheel and the non-engine driven wheel.

8. A vehicle drive transmission system comprising:

an internal combustion engine;

an electric motor that is mechanically independent from said engine;

front and rear wheels with at least one of said front and rear wheels being an engine driven wheel driven by said internal combustion engine and at least one of said front and rear wheels being a non-engine driven wheel driven by said electric motor; and a hybrid vehicle control apparatus including
- a target motor torque setting section configured to set a target drive torque of said electric motor;
- a motor output limit determining section configured to determine if said target drive torque of said electric motor reaches an output limit of said electric motor under current operating conditions; and
- a torque increasing section configured to increase drive torque to said engine driven wheel when it is determined that the target drive torque of the electric motor reaches the output limit of the electric motor.

9. The vehicle drive transmission system as recited in claim 8, wherein
an additional electric motor is connected to said engine.

10. The vehicle drive transmission system as recited in claim 8, further comprising
- a slippage degree detecting section configured to detect a degree of slippage of said engine driven wheel with respect to a road surface; and
- a torque increase suppressing section configured to suppress increase of drive torque by said torque increasing section when said degree of slippage detected by said slippage degree detecting section exceeds a predetermined allowable limit.

11. The vehicle drive transmission system as recited in claim 10, wherein
said slippage degree detecting section is configured to detect said slippage degree based on the rotational speed difference between said engine driven wheel and said non-engine driven wheel.

12. The vehicle drive transmission system as recited in claim 11, wherein
said torque increasing section is configured to increase drive torque to said engine driven wheel by an amount equivalent to an amount by which said output limit of said electric motor is insufficient with respect to said target drive torque of said electric motor.

13. The vehicle drive transmission system as recited in claim 12, further comprising
a total drive torque reducing section configured to reduce a driver-intent-based total drive torque when total drive torque is being obtained by both said engine driven wheel and said non-engine driven wheel.

14. The vehicle drive transmission system as recited in claim 8, wherein
said torque increasing section is configured to increase drive torque to said engine driven wheel by an amount equivalent to an amount by which said output limit of said electric motor is insufficient with respect to said target drive torque of said electric motor.

15. The vehicle drive transmission system as recited in claim 14, further comprising
a total drive torque reducing section configured to reduce a driver-intent-based total drive torque when total drive torque is being obtained by both said engine driven wheel and said non-engine driven wheel.

16. The vehicle drive transmission system as recited in claim 8, wherein
a pair of said rear wheels are driven by said internal combustion engine and a pair of said front wheels are driven by said electric motor.

17. A hybrid vehicle control apparatus for a vehicle having front and rear wheels with at least one of the front and rear wheels being an engine driven wheel driven by an internal combustion engine and at least one of the front and rear wheels being a non-engine driven wheel driven by an electric motor that is mechanically independent from the engine, said hybrid vehicle control apparatus comprising:
- a target motor torque setting means for setting a target drive torque of the electric motor;
- a motor output limit determining means for determining determine if said target drive torque of the electric motor reaches an output limit of the electric motor under current operating conditions; and
- a torque increasing means for increasing drive torque to the engine driven wheel when it is determined that said target drive torque of the electric motor reaches said output limit of the electric motor.

18. The hybrid vehicle control apparatus as recited in claim 17, further comprising
- a slippage degree detecting means for detecting a degree of slippage of the engine driven wheel with respect to a road surface; and
- a torque increase suppressing means for suppressing increase of drive torque by said torque increasing means when said degree of slippage detected by said slippage degree detecting means exceeds a predetermined allowable limit.

19. The hybrid vehicle control apparatus as recited in claim 17, further comprising
a total drive torque reducing means for reducing a driver-intent-based total drive torque when total drive torque is being obtained by both the engine driven wheel and the non-engine driven wheel.

* * * * *

UNITED STATES PATENT AND TRADEMARK OFFICE
CERTIFICATE OF CORRECTION

PATENT NO. : 6,617,704 B2
DATED : September 9, 2003
INVENTOR(S) : Saburo Tomikawa It is certified that error appears in the above-identified patent and that said Letters Patent is hereby corrected as shown below:

<u>Title page,</u>
Item [*] Notice, please cancel
"*[*] Notice: Subject to any disclaimer, the term of this patent is extended or adjusted under 35 U.S.C. 154(b) by 0 days"

and please insert the following:

-- [*] Notice: Subject to any disclaimer, the term of this patent is extended or adjusted under 35 U.S.C. 154(b) by 80 days. --

Signed and Sealed this

Seventh Day of September, 2004

JON W. DUDAS
*Director of the United States Patent and Trademark Office*